Aug. 12, 1947. E. SCHEYER Re. 22,905

FLEXIBLE WELDED STRUCTURAL CONNECTION

Original Filed April 12, 1944

Inventor
Emanuel Scheyer

Reissued Aug. 12, 1947

Re. 22,905

UNITED STATES PATENT OFFICE 22,905

FLEXIBLE WELDED STRUCTURAL CONNECTION

Emanuel Scheyer, New York, N. Y.

Original No. 2,382,584, dated August 14, 1945, Serial No. 530,627, April 12, 1944. Application for reissue October 23, 1945, Serial No. 624,043

9 Claims. (Cl. 189—36)

This invention relates to welded connections between structural members. The material of such members is usually of steel. The connections are of such nature that the deformations of the connected members are largely prevented from producing secondary stresses in the weldings. The connecting piece used to join the members is essentially a plate, although it may have a flange for an erection seat, which plate is thin or flexible enough between weldings so that the deformation of the members is not materially restrained, thereby largely preventing said deformation from producing stress in the weldings. Where the connecting piece is too thick or stiff to be normally flexible enough, it is deliberately weakened by a reduction in its cross sectional area at a zone of substantial width or at several spaced locations. Where there is such a reduction in area, the metal remaining in the connecting piece at the reduced section or sections, is sufficient to transmit the shear or load from the beam to the support. It is possible, to effect the weakening, instead of by reducing the area, by softening the connecting member at the desired locations by controlling its ingredients such as by removing some of the carbon from steel by means of the oxy-acetylene flame.

Where a horizontal beam, such as a floor beam, is connected end on to the side of a column or to the web of another beam, that is, in general, where the connection is made to the side of a vertically extending portion of a member, a vertical plate is used as a connecting piece. The term plate, where consistent with the context, is used for simplicity, although it may be provided with a horizontally extending flange or shelf to act as an erection seat.

It is an object of the present invention to provide a flexible welded connection between a beam and its support, where the support is too shallow to provide enough space for all of the required welding between the connecting piece and the support, below the bottom flange and above the top flange of the beam. Accordingly, a considerable portion of the welding between the connecting piece and the support comes at a height opposite the beam.

Where the connecting piece does not or cannot extend to any substantial extent below the bottom flange and above the top flange of the horizontal beam which is to be supported, said piece is subjected to reverse bending. A typical case where the connecting piece is limited in depth to the beam which is to be supported is where the latter is connected to the web of a shallow girder or stringer. The reverse bending action on the connecting piece, which is relatively short, would subject the weldings between it and the beam and between it and the support, to severe prying action in addition to the vertical shearing stress for which they are provided. The connecting piece is welded at its upper portion to the beam being supported and at its lower portion to the support. Broadly speaking, however, these locations can be reversed, that is the connecting piece is welded at its lower portion to the beam and at its upper portion to the support. Between these two weldings is a point of contraflexure in the connecting piece. In order to keep down the prying action, said piece must be thin enough or flexible enough between the weldings. By providing grooves in the piece on opposite sides of the point of contraflexure and near the inner end of the weldings, flexibility can also be obtained. Other forms of weakening than grooves, as will be explained hereafter, also may be used.

Where the connecting piece is welded substantially within the depth of the member being supported, the welding between the supported member and the connecting piece is above the neutral axis and the welding between the connecting piece and the support is below the neutral axis.

This application is a continuation in part of my applications Serial No. 474,842 and Serial No. 502,571.

This invention is particularly applicable to the welded connections of beams with relatively large reactions especially where they frame into relatively shallow beams. In the prior welded art, where a light beam is to be supported, a seat angle is used beneath the beam at the support. For heavy loads, a bracket type of connection is used, the seat being reinforced with stiffener plates, or a bracket is used made of a split beam. The use of such a connection produces an eccentric load on the support and the welding between the bracket and the support is subjected to a moment. The welding between the bottom flange of the supported beam and the bracket is subjected to a prying action. Further, the bracket often interferes with the finish or fireproofing around the support, especially where it is a column, because it sticks out therefrom. With a plate flat against the side of the support, as against the flange of a column or web of a supporting beam, there is no projection beyond the finish and no appreciable eccentric moment on the support or the weldings. Where the connection is to a relatively shallow beam, there is no room below the flange of the supported beam for a welded connection angle or bracket. My construction is, therefore, ideally suited for this condition.

It is not safe practice to weld the end of the web of a beam directly to the side of a column because of the deformation of the beam at the column. A similar situation arises where such a welded connection is made directly to the side of a web of a header, stringer or girder or other stiff vertically extending part of a member, such as stiffeners on a girder. However, by making the connection through the intermediacy of a flexible plate, either flexible because of its thinness or flexible because weakened by reducing its area at a predetermined location or locations, the effect of said deformation on the weldings is substantially reduced.

Other objects and advantages will become apparent upon further study of the description and drawing, in which.

Figure 1:
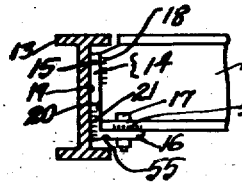
Fig. 1 is an elevation of a beam shown framing with an angle connection to another beam which latter beam is not much deeper than the former.
Figure 2:
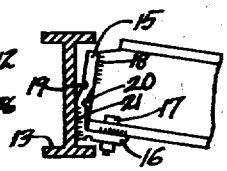
Fig. 2 shows in an exaggerated manner the deformation of said former beam and connection of Fig. 1 when loaded.

Where a cross beam 12, Fig. 1, must frame into a relatively shallow stringer 13, an angle-shaped connection, denoted in its entirety by the numeral 14, is suitable, the horizontal leg 16 serving as an erection seat. Erection bolts 17 serve to hold beam 12 on seat 16. Vertical leg or plate-like portion 15 of the connection is connected by a welding 18 to the upper portion of the web of beam 12. Only the near welding 18 is seen but it is to be understood that there is a similar welding on the far side of the web. Both these weldings together, for the sake of brevity are to be known as welding 18. Leg 15 is connected at its lower portion to the web of beam 13 by a welding 21, far side and near side. When beam 12 is subjected to bending stress, its deformation takes place in a manner similar to that shown for it in Fig. 2. Where leg 15 is thin enough, neglecting for the moment grooves 19 and 20, it will bend readily under the reverse bending moments to which it is subject, with a point of contraflexure about half way between weldings 18 and 21. The ready bending of plate or leg 15 prevents undue or secondary stress from affecting weldings 18 and 21 when beam 12 deforms. It is preferred, however, not to make leg 15 so thin as noted above, but to weaken it between weldings 18 and 21 by grooves 19 and 20 or equivalent means as noted hereafter. Under these conditions, leg 15 will bend when beam 12 is deformed in bending as shown diagrammatically in Fig. 2. It is to be noted that groove 19 extends inward from that surface of leg 15 which faces away from beam 12 while groove 20 extends inward from the surface of leg 15 which faces toward beam 12. This is to prevent "notching" or tearing failure of leg 15. Horizontal leg 16 must also be kept thin enough to be sufficiently flexible to prevent undue stress reaching welding 21 upon the deformation of beam 12. The principal stress, which is the reaction of beam 12, is of course intended to be taken by weldings 18 and 21. All that leg 16 is required to take is the dead weight of beam 12 during erection. To insure sufficient flexibility for leg 16, may be weakened by a groove 55. Other forms of weakening can also be used such as by a series of indentations, holes, notches or the like as will be explained.

Figure 3:
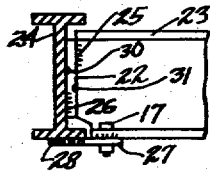
Fig. 3 is an elevation of a beam shown with a plate connection framing to another beam, the former beam requiring coping at its bottom to avoid the bottom flange of the second beam.

In Fig. 3, the erection seat 27, is separate from the connecting plate 22 which takes the place of vertical leg 15 of Fig. 1. Plate 22 is attached to the upper portion of the web of cross beam 23 by welding 25, far and near side. The lower portion of plate 22, opposite the lower portion of the web of beam 23, is attached to stringer 24 by welding 26, far and near side. Because of the location of beam 23 in elevation with respect to stringer 24, that is with both beams flush bottom, it is necessary to block out or cope beam 23. An erection seat is provided for the latter beam by plate 27 which is attached by welding 28, far and near side, to the bottom of the bottom flange of stringer 24. Erection bolts 17 serve to hold beam 23 on plate 27. When beam 12 is subjected to bending stress, its deformation takes place in a manner similar to that shown for it in Fig. 4. Where plate 22 is thin enough, neglecting for the moment grooves 30 and 31, it will bend readily under the reverse bending moments to which it is subject, with a point of contraflexure about midway between weldings 25 and 26. The ready bending of plate 22 prevents undue or secondary stress from effecting weldings 25 and 26 when beam 23 deforms in bending. It is preferred, however, not to make plate 22 so thin, as noted above, but to weaken it between weldings 25 and 26 by grooves 30 and 31 or other ways of locally reducing its cross sectional area. Under these conditions, plate 22 will bend when beam 12 is deformed as shown diagrammatically in Fig. 4. For the same reasons and in a similar manner to the grooves 19 and 20 of Fig. 1, groove 30 extends inward from that surface of plate 22 which faces toward beam 24, while groove 31 extends inward from the surface which faces toward beam 23.

Figure 5:
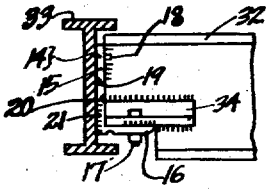
Fig. 5 is an elevation of a beam shown framing with an angle connection to another beam, the former beam requiring substantial blocking out of its web.

In Fig. 5, the angle-shaped connection 14 is used to connect a cross beam 32 to a stringer 33. In this case, the bottom flange of the cross beam comes below the bottom flange of the stringer requiring that a considerable portion of the web of beam 32 be blocked out. A bearing angle 34, far and near side, is provided on the web of beam 32 which rests on horizontal leg 16. Erection bolts 35 serve to connect angles 34 to erection seat 16. The rest of the weldings 18 and 21 and grooves 19 and 20 are similar in location and function to that shown for them in Fig. 3.

Figure 6:
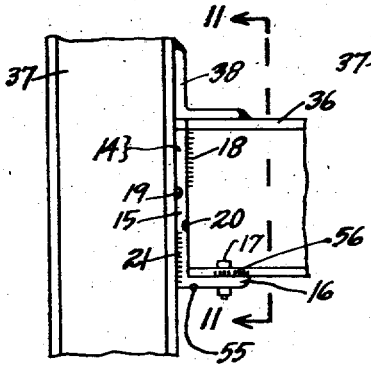
Fig. 6 is an elevation of a beam shown framing to the side of the column with an angle connection.
Figure 11:
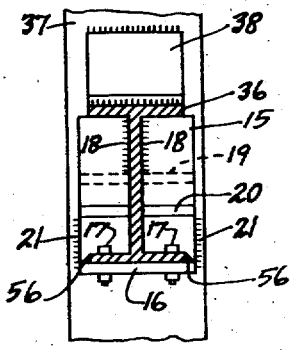
Fig. 11 is a section taken along the line 11—11 of Fig. 6.

In Figs. 6 and 11, the angle-shaped connection 14 is used to connect beam 36 to column 37. The function and relative location of weldings 18 and 21 and grooves 19 and 20 are similar to that explained for Fig. 1, except that welding 21, far and near side is to the flange of column 37. Outstanding leg 16 serves as an erection seat with erection bolts 17. Groove 55 weakens leg 16 to relieve welding 21 of secondary stress when beam 36 deflects. Angle 38 is customarily used in multiple tier buildings to help stiffen them against wind.

Figure 4:
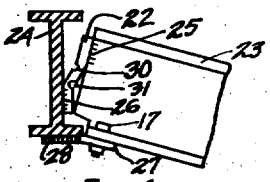
Fig. 4 shows in an exaggerated manner the deformation of said former beam and connection of Fig. 3 when loaded.
Figure 7:
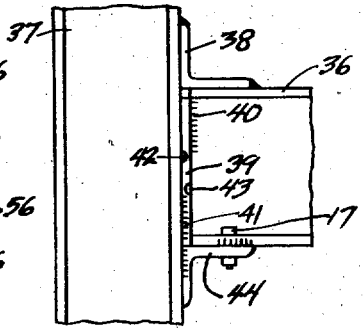
Fig. 7 is an elevation of a beam shown framing to the side of the column with a plate connection, a separate angle being mounted on the column beneath the beam to serve as an erection seat.

In Fig. 7, the connection of beam 36 to column 37 is made by means of a connecting plate 39 similar in action to connecting plate 22 of Figs. 3 and 4. Beam 36 is attached to plate 39 by welding 40, far and near side, which is above groove 42. Plate 39 is attached to column 37 by welding 41, far and near side. The latter welding is below groove 43. For an erection seat, a separate angle 44 is welded to column 37 for beam 36 to rest upon.

Figure 8:
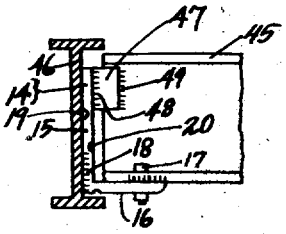
Fig. 8 is an elevation of a beam shown framing with an angle connection to another beam, the latter beam being relatively shallow, extension plates being used to make up erection clearance.

The connection of Fig. 8 is similar to that of Fig. 1 as far as the relative positions of the bottom flanges of cross beam 45 and stringer 46 are concerned. The connection is one having extension plates 47, the near one only being seen, to make up for erection clearance where it occurs between the end of a cross beam and the vertical part of its supporting member, the web of beam 46 in this case. Angle-shaped connection piece 14 is attached by welding 18 at the lower part of vertical leg 15 to stringer 46. Extension plate 47, at one edge, is attached to the upper portion of leg 15 by welding 48 and at the other edge by welding 49 to the web of beam 45. Leg 15 with or without grooves 19 and 20 and erection seat 16 function as in Fig. 1.

Figure 9:
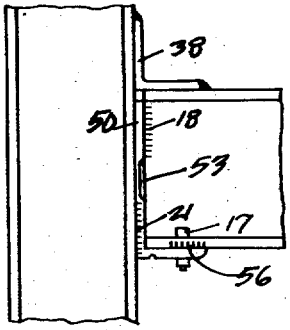
Fig. 9 is an elevation of a beam shown framing with an angle connection to the side of the column, the vertical leg of the angle being reduced in area over a relatively wide zone which extends substantially the full distance between the upper and lower weldings.

In Fig. 9, the vertical leg 50 or plate-like portion of the connection piece is weakened between upper and lower weldings 18 and 21 in one wide zone 53 extending substantially the full distance between the weldings instead of employing spaced grooves 19 and 20 as in Fig. 6 or spaced grooves 30 and 31 as in plate 22 of Fig. 3. The rest of the connection is similar in construction and function as in Fig. 6. The wide zone of weakening 53 is shown in Fig. 9 in the vertical leg 50 of an angle connecting piece, but it will be understood that such a zone could just as well be used in a connection plate, as plate 22 in Fig. 3 in place of grooves 30 and 31 or plate 39, Fig. 7 in place of grooves 42 and 43.

Figure 10:
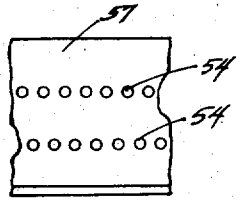
Fig. 10 is a front elevation of a fragment of a connecting piece showing a modified form of weakening differing from the continuous grooves of Figs. 1 to 8 by having openings or indentations taking the place of the grooves.

Fig. 10 shows a modified form of weakening for a connection piece. It shows a front elevation of a fragment for example of a connection angle 57 which is weakened by having its area reduced from what it is elsewhere by means of holes 54. It is not necessary that the weakening be done by holes; what is indicated as holes 54 could be indentations instead.

In Figs. 1, 5, 6, 8 and 9, the leg forming the erection seat, where not thin enough to be sufficiently flexible to prevent the deformation of the cross beam from producing undue stress in the main welding, such as welding 21 in Fig. 1, is reduced in area locally by means of a groove 55, or equivalent holes or indentations.

Erection seat welding 56 is merely nominal and is not intended to take principal stresses.

The term a "welding" is intended also to cover other types of welding than fillet welding, where consistent with the context, such as resistance welding and interfacial welding.

I claim:

1. A welded shear connection between two structural members, one being a substantially horizontal beam with substantially vertical web, said beam being subject to bending, the other member having a substantially vertical portion to which the beam is connected, said connection comprising a substantially vertically extending piece between the beam and said vertical portion, a welding between the piece and each of said members, the welding between the piece and the beam having a substantial vertical space between it and the welding of the piece to said vertical portion, the welding between the piece and the beam coming at the upper portion of the beam and the welding between the piece and said vertical portion being opposite the lower portion of the beam, said latter welding extending a substantial distance above the bottom flange of the beam, said piece being sufficiently flexible between weldings to permit it to bend readily, permitting substantially the normal deformation of the beam when subject to bending, largely preventing thereby stress in the weldings due to said deformation.

2. A welded shear connection between two structural members, one being a substantially horizontal beam with substantially vertical web, said beam being subject to bending, the other member having a substantially vertical portion to which the beam is connected, said connection comprising a substantially vertically extending piece between the beam and said vertical portion, a welding between the piece and each of said members, the welding between the piece and the beam having a substantial vertical space between it and the welding of the piece to said vertical portion, the welding between the piece and the beam being located entirely above the neutral axis of the beam and the welding between the piece and said vertical portion being located opposite the lower portion of the beam entirely below said neutral axis and extending for a substantial distance above the bottom flange of the beam, said piece being sufficiently flexible between weldings to permit it to bend readily, permitting substantially the normal deformation of the beam when subject to bending, largely preventing thereby stress in the weldings due to said deformation.

3. A welded shear connection between two structural members, one being a substantially horizontal beam with substantially vertical web, said beam being subject to bending, the other member having a substantially vertical portion to which the beam is connected, said connection comprising a substantially vertically extending piece between the beam and said vertical portion, a welding between the piece and each of said members, the welding between the piece and the beam having a substantial vertical space between it and the welding of the piece to said vertical portion, the welding between the piece and the beam coming at the upper portion of the beam and the welding between the piece and said vertical portion being opposite the lower portion of the beam, said latter welding extending a substantial distance above the bottom flange of the beam, the relative position of the weldings inducing a point of contraflexure in the piece when the beam is stressed in bending, said piece being sufficiently weakened by having its section reduced between the weldings and on both sides of the point of contraflexure, to permit substantially the normal deformation of the beam, largely preventing thereby said deformation from producing stress in the weldings, the metal remaining in the piece where reduced in section being sufficient to transmit the shear.

4. A welded shear connection between two structural members, one being a substantially horizontal beam with substantially vertical web, said beam being subject to bending, the other member having a substantially vertical portion to which the beam is connected, said connection comprising a substantially vertically extending plate between the beam and said vertical portion, a welding between the plate and each of said members, the welding between the plate and the beam having a substantial vertical space between it and the welding of the plate to said vertical portion, the welding between the plate and the beam being located entirely above the neutral axis of the beam and the welding between the plate and said vertical portion being located opposite the lower portion of the beam entirely below said neutral axis and extending for a substantial distance above the bottom flange of the beam, the relative position of the weldings inducing a point of contraflexure in the plate when the beam is stressed in bending, said plate being sufficiently weakened by having its section reduced between the weldings and on both sides to the point of contraflexure, to permit substantially the normal deformation of the beam, largely preventing thereby said deformation from producing stress in the weldings, the metal remaining in the plate where reduced in section being sufficient to transmit the shear.

5. A welded shear connection between two structural members, one being a substantially horizontal beam with substantially vertical web, said beam being subject to bending, the other member having a substantially vertical portion to which the beam is connected, said connection comprising an angle-shaped connecting piece with one leg thereof extending vertically between the beam and said vertical portion, the other leg thereof extending horizontally from the bottom of the vertical leg and serving as an erection seat for the beam, a welding between the vertical leg and the upper portion of the web of the beam, and a welding between the vertical leg and said vertical portion opposite the lower portion of the beam, said weldings having a substantial vertical space between them, said vertical leg having a reduction in area between the weldings along two vertically spaced substantially horizontal lines to permit said vertical leg to bend readily with the deformation of the beam when stressed in bending, largely preventing thereby said deformation from producing stress in the weldings.

6. A welded shear connection between two structural members, one being a substantially horizontal beam with substantially vertical web, said beam being subject to bending, the other member having a substantially vertical portion to which the beam is connected, said connection comprising a substantially vertically extending plate between the beam and said vertical portion, a welding between the plate and the upper portion of the web of the beam, and a welding between the plate and said vertical portion opposite the lower portion of the beam, said weldings having a substantial vertical space between them, said plate having a reduction in area between the weldings along two vertically spaced substantially horizontal lines to permit the plate to bend readily with the deformation of the beam when stressed in bending, largely preventing thereby said deformation from producing stress in the weldings.

7. A welded shear connection between two structural members, one being a substantially horizontal beam with substantially vertical web, said beam being subject to bending, the other member having a substantially vertical portion to which the beam is connected, said connection comprising a plate-like portion extending between the beam and said vertical portion, a welding between the plate-like portion and the upper portion of the beam, and a welding between the plate-like portion and said vertical portion opposite the lower portion of the beam, said weldings having a substantial vertical space between them, said plate-like portion having between the upper and lower weldings a pair of vertically spaced horizontal grooves extending in from opposite surfaces thereof, the upper groove extending inward from the surface away from the beam and the lower groove extending inward from the surface toward the beam, said grooves weakening the plate-like portion sufficiently in bending to permit the normal deformation of the beam when stressed in bending without producing substantial secondary stress in the weldings.

8. A welded shear connection between two structural members, one being a substantially horizontal beam with substantially vertical web, said beam being subject to bending, the other member having a substantially vertical part to which the beam is connected, said connection comprising a substantially vertically extending portion between the beam and said part and a substantially horizontally extending flange portion serving as an erection seat for the beam, a welding between the plate and each of said members for the support of the beam by said part, said vertical portion being sufficiently flexible between weldings to permit it to bend readily without producing substantial stress in the weldings due to the deformation of the beam when subject to bending, said flange portion being materially reduced in cross sectional area at a location near said vertical portion to permit the flange to bend readily with said deformation of the beam largely preventing thereby stress in the weldings due to said deformation.

9. A welded shear connection between two structural members, one being a substantially horizontal beam with a substantially vertical web, said beam being subject to bending, the other member having a substantially vertical portion to which the beam is connected, said connection comprising a substantially vertically extending piece between the beam and said vertical portion, said piece having a vertical extent substantially equal to the depth of the beam and being located opposite the beam for substantially its entire vertical extent, a welding between the piece and each of said members, the welding between the piece and the beam having a substantial vertical space between it and the welding of the piece to said vertical portion, said piece being sufficiently flexible between weldings to permit it to bend readily, permitting substantially the normal deformation of the beam when subject to bending, largely preventing thereby stress in the weldings due to said deformation.

EMANUEL SCHEYER.